United States Patent [19]

Larkin

[11] Patent Number: 4,637,375
[45] Date of Patent: Jan. 20, 1987

[54] INTEGRATED SOLAR HEATING UNIT

[76] Inventor: William J. Larkin, 2622 Newport Blvd., Newport Beach, Calif. 92663

[21] Appl. No.: 824,877

[22] Filed: Jan. 31, 1986

Related U.S. Application Data

[63] Continuation-in-part of Ser. No. 737,864, May 28, 1985, Pat. No. 4,567,878.

[51] Int. Cl.$^4$ .................................................. F24J 2/44
[52] U.S. Cl. .................................... 126/434; 126/420; 126/450
[58] Field of Search ............... 126/420, 418, 434, 433, 126/437, 435, 448, 450; 138/28, 29, 30

[56] References Cited

U.S. PATENT DOCUMENTS

| | | | |
|---|---|---|---|
| 1,889,238 | 11/1932 | Clark | 126/434 |
| 2,122,821 | 7/1938 | Mohr | 126/434 |
| 4,084,578 | 4/1978 | Ishibashi | 126/434 |
| 4,237,866 | 12/1980 | Rush | 126/434 |
| 4,284,066 | 8/1981 | Brow | 126/434 |
| 4,306,544 | 12/1981 | Clemens | 126/434 |

FOREIGN PATENT DOCUMENTS

| | | | |
|---|---|---|---|
| 26540 | 2/1979 | Japan | 126/434 |
| 138650 | 10/1981 | Japan | 126/434 |
| 140564 | 8/1983 | Japan | 126/420 |

*Primary Examiner*—James C. Yeung
*Attorney, Agent, or Firm*—Ralph S. Branscomb

[57] ABSTRACT

The instant solar heating unit takes advantage of anti-reverse-siphon techniques developed by the inventor and combines anti-freeze features, and houses the entire unit in a wedge-shaped, integral cocoon to retain heat and enclose the piping and fixtures. In the preferred embodiment, the collector panel has tube manifolds which are adjacent the hot water tank to keep them from freezing, and the tubes of the collector, which are exposed through the panel glazing to radiate their heat at night, are expansible to prevent their rupture in the event of a freeze.

7 Claims, 4 Drawing Figures

U.S. Patent  Jan. 20, 1987  4,637,375
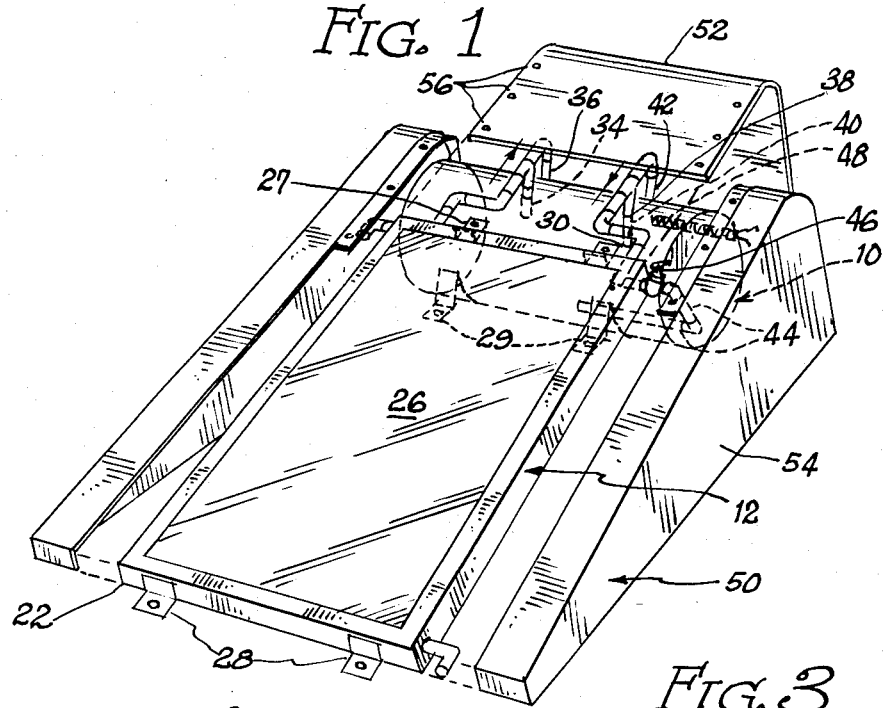
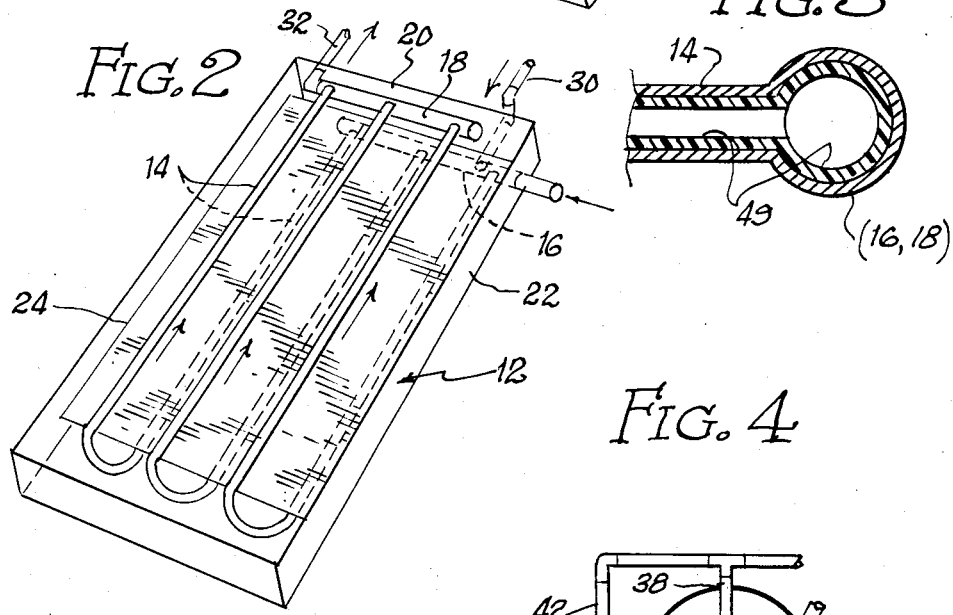
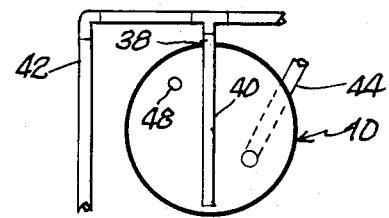

INTEGRATED SOLAR HEATING UNIT

The invention is a continuation-in-part of the Solar Anti-Reverse Siphon System which was filed in the U.S. Patent Office on May 28, 1985 under Ser. No. 737,864 and will issue as U.S. Pat. No. 4,567,878 on Feb. 4, 1986. That application in turn related to U.S. Pat. Nos. 4,428,362 and 4,519,383, both issued in the inventor of the instant invention.

BACKGROUND OF THE INVENTION

The invention is in the field of solar heating, and more particularly pertains to domestic hot water heating and storage using a normally completely passive flat plate collector system with built-in passive anti-reverse siphon features and anti-freeze-damage construction.

The parent patent to this application and its predecessors described and claimed various applications and modifications of an anti-reverse-siphon system using a passive anti-reverse-siphon loop, or "ARS" loop. Previously, unless there were an electrical or mechanical device to prevent back flow, the hot water tank had to be elevated above the flat plate collector so that when the collector cooled at night to well below the temperature in the hot water storage tank, the dense, cold water would settle to the bottom of the system, which would be the collector. If the tank were at the same height as the collector or lower than the top of the collector, the pressure head developed on a cold night by the cold water in the collector would overcome the pressure in the not-so-cold cold water supply line to the collector and cause the system to reverse-siphon, systematically drawing all of the previously heated water from the hot water tank through the collector and cooling it to ambient temperature before returning it to the tank. Obviously this was not desireable.

But by the device of the ARS loop, the tank can be at the same height as the collector, making it possible to integrate the collector and tank into more compact, efficient, easily installed and aesthetically pleasing packages than were possible when working within the constraint of having to have the tank above the collector.

The ARS loop basically comprises a downwardly concave loop that extends from a lower portion of the hot water storage tank up through the tank, exiting the tank through its top, passing up and then looping back down to define the cold water supply line for the flat plate collector. When the collector cools at night to temperatures well below the temperature in the tank, the collector panel will begin to backflow. But, with the ARS loop in place, the backflow will be essentially stopped because now the pressure head of the cold water in the collector panel supply line cannot dump directly into the bottom of the storage tank unimpeded, but must overcome the opposing pressure head developed by the hot water in the dip tube extending down into the hot water tank.

SUMMARY OF THE INVENTION

The invention described and claimed herein incorporates the ARS technology described above into a neat wedge-shaped package that expands at an angle of about 15° and which, when properly positioned on a roof of about that pitch, will make an angle of about 30° to the horizontal, which is an effective overall angle if the solar panel is southerly directed.

The solar unit of the instant invention has a wedge-shaped housing that mounts the top edge of the inclined collector panel adjacent the horizontally extended cylindrical hot water tank such that either the hot water manifold of a conventional collector or both the hot and cold water manifolds of the optionally freezable collector panel are warmed by the tank itself to prevent their freezing on cold nights, particularly in the higher latitudes.

An intrinsic freeze-prevention feature of the system, adequate down to ambient temperatures of perhaps 15° F., is the ARS loop bypass line and valve, which permits the system to enter a natural reverse-flow mode, cycling warm water from the hot water storage tank slowly through the collector. Of course this dissipates the heat that has been collected by the system, but it prevents the system from freezing up.

To augment the naturally occurring backflow that occurs as soon as the ARS loop is bypassed when freezing temperatures are approached in the collector at night, a 1500-2000 watt immersion heater may be incorporated in the hot water tank, so positioned to encourage back flow and to ensure that the water backflowing into the collector is really hot, to positively prevent freezing, in a manner that is active, but still utilizing no moving parts other than the valve in the ARS loop bypass.

For system protection against ambient temperatures in the vicinity of 0° F., the optional freezable collector must be used. The freezable collector has both the hot and cold water manifolds of the collector panel adjacent to the hot water tank to mitigate against freezing, and the plate tubes are interiorly lined with a material line EPDM, a highlyvdurable and flexible synthetic elastomer whi F. to +320° F. The lined tubes can actually freeze without rupturing or damage.

By virtue of the use of rupture-proof tubes in the exposed portion of the collector, and the freeze-proofing of the manifolds achieved by their proximity to the hot water tank, a "freeze-proof" system is achieved. When the freezing temperatures subside, and the sun once again shines with sufficient force to warm the collector, the frozen tubes quickly thaw under the sun's rays and the system begins to function normally as a solar collector system.

If the hot water manifold had not been prevented from freezing, the tubes would thaw but the manifolds would be choked with chunks of ice. Under these circumstances, the thawed ice in the collector tubes might well be quickly converted to steam in an efficient collector because the ice in the manifolds would block the normal water circulation, and the steam would rupture the tubes. So the expansible tube construction and the warmed manifolds work together to form a "freeze-proof" system that is immune to the damage that freezing weather would otherwise cause to the system.

There are other features introduced by this disclosure beyond the freeze-proofing. These include the provision of a totally enclosed housing that encapsulates the collector and tank as a cocoon-like unit to more efficiently retain heat, as well as creating an aesthetically pleasing appearance. The housing also encloses the plumbing of the system, protecting it from the elements as well as helping cosmetically.

BRIEF DESCRIPTION OF THE DRAWINGS

FIG. 1 is an exploded perspective view of the system;

FIG. 2 is a perspective view of the solar panel showing certian of the plumbing features in phantom;

FIG. 3 is a section through a typical lined tube and manifold section showing the lining; and, FIG. 4 is a diagrammatic view as seen from a section taken centrally and longitudinally through the tank primarily illustrating the descent of the dip tube down into the hot water tank and the bypass line.

DETAILED DESCRIPTION OF THE PREFERRED EMBODIMENTS

The solar heater unit of the instant invention is best shown overall in FIG. 1. The unit includes a hot water storage tank 10 and a flat solar collector panel 12.

The panel 12, either a conventional collector or as detailed in FIG. 2, is rectangular in planform, has a serpentine collector tube array which in the instant case comprises several U-shaped tubes 14, a cold water manifold 16 and a hot water manifold 18, both mounted near the top edge 20 of the panel and retained in the rectangular frame 22 of the panel.

The panel also has a sheet 24 of preferably blackened, heat conductive material such as copper or aluminum to absorb the sun's rays and conduct the heat to the collector tubes, insulation beneath the tank and a glazed window 26.

The upper edge 20 of the panel is preferably hingedly mounted to an upper portion of the tank 10 as shown at 27 in FIG. 1 such that the panel strikes about a 15° angle with the surface on which the unit rests, and the surface itself should ideally have about a 15° southerly decline to orient the panel surface at an angle of about 30° to the horizontal, facing into the sun. The bottom of the panel would be mounted to the roof by flanges 28 and the tank is mounted to the roof by the saddles 29.

At the top of the panel, the cold water inlet 30 and the hot water outlet 32 are shown in FIG. 2. The hot water outlet empties into the top of the tank as shown at 34, and hot water supply pipe 36 exits the tank to service the house. The cold water inlet pipe 30, on the other hand, has a dip tube 40, best shown in FIG. 4, which originates near the bottom of the tank, extends up through the hot water in the tank and exits the hot water storage tank at 38, connected to with the cold water supply pipe 42. The fresh water needed in the system as hot water is drawn off is provided from fresh water supply pipe 42. The dip tube 40 and the plumbing connecting it to the cold water manifold 16 of the collector define the inverted "U" of the ARS loop.

In the event that the unit is desired to back flow, as it would normally at night without the ARS loop, an ARS loop bypass 44 is provided, which is actuated by means of the bypass valve 46. This bypass connects from the outside directly into the bottom of the hot water tank, with no dip tube or ARS loop, so that at night, when water in the collector cools to about 40° F., cold water cooled in the panel by radiation will flow into the bottom of the hot water tank, drawing hot water from the tank through the hot water connection 34 down the face of the panel. To enhance this action even more, a 1500- to 2000-watt immersion heater 48 could be placed in the tank, to actuate when the bypass valve opens to ensure that there is always hot water in the tank to warm the collector, even over extended periods of cold.

To substantially circumvent the problem of freezing, the tubes 14 in the panel, and even the manifolds 16 and 18 themselves, could be lined with EPDM to absorb the expansion of the water in the tubes as it freezes, which adds about 5% to the water's volume. The EPDM lining is indicated at 49 in FIG. 3.

Additionally, it is not good for the manifolds to freeze, even if they are lined with EPDM, inasmuch as they are thicker than the tubes and not exposed to the sunlight through the glazing, and thus take a relatively long time to thaw out. While the manifolds are still clogged with ice after a thaw, the collector tubes would have melted and gotten very hot because the normal flow of the heated water is blocked by the ice in the manifolds. The hot water could vaporize into steam, rupturing the system, and all because the ice in the manifolds would not melt fast enough. It is for this reason that the manifolds are mounted adjacent the hot water tank to keep them from freezing.

Surrounding the entire system, enclosing it for additional heat conservation and asthetics, is an optional housing 50. The housing comprises a hood piece 52, and a pair of side skirts 54, all shown in exploded perspective in FIG. 1. The hood and screws would ordinarily be fastened together with screws, and screwed to the collector panel through screw holes such as those indicated at 56 in FIG. 1.

I claim:

1. An integral solar heating unit with an integral solar collector and hot water storage system, said unit comprising:
   (a) a housing;
   (b) a flat plate solar collector panel mounted in said housing and having a generally horizontal upper edge and an uninsulated, open back surface;
   (c) a cylindrical hot water tank operatively connected to said solar collector panel and mounted in said housing generally parallel to and adjacent to said upper edge;
   (d) said housing comprising a hood around said tank a pair of side skirts extending down at the sides of said panel, said hood and side skirts terminating at lower edges which together substantially define a plane such that upon placing said heating unit on a generally planar surface, said housing substantially encapsulates said collector panel and hot water tank in a substantially enclosed air space;
   (e) said collector including a plurality of longitudinally extended U-shaped collector tubes and a glazed window to pass radiation through to said collector tubes, and a first cold water manifold connected to said tubes for delivering fresh water thereto and a second hot water manifold connected to said tubes to remove heated water therefrom, and said manifolds are adjacent and at least somewhat above and in direct thermal contact with said tank; and,
   (f) said skirts and hood lapping around said collector panel, exposing only said glazed window, such that everything else in said heating unit is enclosed by said housing such that heat emanating from the uninsulated, open back face of the collector and tank is captured and retained by said housing to warm said manifolds.

2. Structure according to claim 1 wherein at least those portions of said tubes exposed through said glazed window are internally expandable, by virtue of being lined with a compressible lining material, which is sufficiently compressible to permit the expansion of freezing water therein without causing damage to the tubes.

3. Structure according to claim 2 wherein the above-mentioned exposed portions of said tubes are internally lined with EPDM to accomodate the expansion of water therein.

4. Structure according to claim 1 wherein all the piping, by which said hot water tank is operatively connected to said collector panel, which is external of said tank and collector panel, is enclosed within said housing and thus warmed to protect against freezing.

5. Structure according to claim 4 wherein said piping has a cold water inlet to supply said collector panel with fresh water, and including a dip tube communicating with said cold water inlet and extending down into the lower portion of said hot water tank to define the depending portion of an anti-reverse-siphon loop.

6. Structure according to claim 5 and including a valved bypass connecting said cold water inlet directly to said tank to bypass said dip tube to permit said heating unit to reverse siphon in a natural way when said valve is actuated to prevent said collector panel from freezing.

7. Structure according to claim 6 and including an immersion heater in said tank to further warm said collector panel and accellerate the reverse flow therein to assist in preventing same from freezing when the bypass valve is actuated.

* * * * *